United States Patent
Davis

(10) Patent No.: US 9,815,198 B2
(45) Date of Patent: Nov. 14, 2017

(54) SYSTEM AND METHOD FOR DETERMINING A WORK OFFSET

(71) Applicant: X Development LLC, Mountain View, CA (US)

(72) Inventor: Benjamin M. Davis, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 227 days.

(21) Appl. No.: 14/807,464

(22) Filed: Jul. 23, 2015

(65) Prior Publication Data

US 2017/0021500 A1  Jan. 26, 2017

(51) Int. Cl.
  *B25J 9/16* (2006.01)
  *G05B 19/408* (2006.01)

(52) U.S. Cl.
  CPC ........... *B25J 9/1664* (2013.01); *B25J 9/1697* (2013.01); *G05B 19/4083* (2013.01); *G05B 2219/33271* (2013.01); *G05B 2219/36503* (2013.01); *G05B 2219/39032* (2013.01)

(58) Field of Classification Search
  CPC ... B25J 9/1664; B25J 9/1697; G05B 19/4083; G05B 2219/33271; G05B 2219/36503; G05B 2219/09032
  See application file for complete search history.

(56) References Cited

U.S. PATENT DOCUMENTS

| | | | |
|---|---|---|---|
| 4,590,578 A | 5/1986 | Barto, Jr. et al. | |
| 5,471,312 A | 11/1995 | Watanabe et al. | |
| 5,661,654 A | 8/1997 | Nagashima | |
| 6,243,621 B1 | 6/2001 | Tao et al. | |
| 6,298,278 B1 | 10/2001 | Pierse | |
| 6,836,944 B2 | 1/2005 | Batrin | |
| 7,269,479 B2 * | 9/2007 | Okamoto | B25J 5/007 318/568.12 |

(Continued)

FOREIGN PATENT DOCUMENTS

JP  60054011 A1  3/1985

OTHER PUBLICATIONS

Bonitz et al., "Calibrating a Multi-manipulator Robotic System", Robotics & Automation Magazine, IEEE, Mar. 1997.

(Continued)

*Primary Examiner* — McDieunel Marc
(74) *Attorney, Agent, or Firm* — McDonnell Boehnen Hulbert & Berghoff LLP

(57) ABSTRACT

Systems and methods are disclosed for determining work offset data for a robot in a work environment. In an embodiment, a robot operating in a work environment receives an indication to determine a work offset. The work offset describes the location and angular orientation of a working plane of the work environment relative to a base plane of the robot. In response to the indication, the robot identifies the working plane. The robot is controlled to contact one or more points of the working plane. The robot determines respective point locations of the contacted points relative to the base plane based on the respective positions of the robot at respective times of contact. The robot determines the location and angular orientation of the working plane relative to the base plane based on the determined respective point locations of the contacted points.

20 Claims, 9 Drawing Sheets

(56) References Cited

U.S. PATENT DOCUMENTS

| | | |
|---|---|---|
| 7,591,078 B2 | 9/2009 | Crampton |
| 7,979,159 B2 | 7/2011 | Fixell |
| 8,121,732 B2 | 2/2012 | Hashimoto et al. |
| 8,122,846 B2 | 2/2012 | Stiblert et al. |
| 8,406,922 B2 | 3/2013 | Nemmers et al. |
| 8,467,901 B2 | 6/2013 | Brogardh |
| 8,588,974 B2 | 11/2013 | Aoba et al. |
| 9,329,587 B2 * | 5/2016 | Fudaba .................. G05B 15/02 |
| 9,335,752 B2 * | 5/2016 | Fudaba ...................... B25J 3/04 |
| 9,415,516 B2 * | 8/2016 | Fudaba .................. B25J 9/1689 |
| 9,516,996 B2 * | 12/2016 | Diolaiti ............. A61B 1/00009 |
| 2009/0033271 A1 | 2/2009 | Hon et al. |
| 2010/0270271 A1 * | 10/2010 | Jacob ..................... B23K 11/25 219/86.25 |

OTHER PUBLICATIONS

Pradeep et al., "Calibrating a multi-arm multi-sensor robot: A Bundle Adjustment Approach", International Symposium on Experimental Robotics (ISER), pp. 1-3, Dec. 2010.

* cited by examiner

SYSTEM AND METHOD FOR DETERMINING A WORK OFFSET

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems that can operate alongside and interface with humans becomes apparent. Therefore, a demand for such robotic systems has helped open up a field of innovation in actuators, sensing techniques, controllers, as well as component design and assembly.

SUMMARY

Example systems and methods may provide for determining work offset data for a robot in a work environment. The work offset may describe a location and an angular orientation of a working plane of a work environment relative to a base plane of the robot. The robot may initiate a work offset determination method by identifying a working plane. The working plane may be identified based on image data from a camera. The robot may then determine a path towards the working plane and begin moving along the path.

Once at the working plane, the robot may be controlled to contact one or more points of the working plane. While contacting the points, the robot may determine point locations of the contacted points based on the positions of the robot at the times of contact. The positions of the robot may be determined based on encoded joint angles. The robot may contact three or more points. Next, the robot may determine the location and angular orientation of the working plane relative to the base plane based on the determined point locations. The work offset data may include a shift distance along a Z axis perpendicular to the base plane, an angular displacement with respect to an X axis of the base plane (tip), and an angular displacement with respect to a Y axis of the base plane (tilt).

In one example, a method is provided that includes receiving an indication to determine a work offset for a robot operating in a work environment, where the work offset describes a location and an angular orientation of a working plane of the work environment relative to a base plane of the robot. The method may also include identifying the working plane within the work environment in response to the indication. The method may also include controlling the robot to contact one or more points of the working plane. The method may also include determining respective point locations of the one or more contacted points relative to the base plane based on respective positions of the robot at respective times of contact. The method may also include determining the location and angular orientation of the working plane relative to the base plane based on the determined respective point locations of the one or more contacted points.

In an additional example, a non-transitory computer readable medium is provided that stores instructions that are executable by one or more computing devices. When the instructions are executed, the instructions cause the one or more computing devices to perform functions that include receiving an indication to determine a work offset for a robot operating in a work environment, where the work offset describes a location and an angular orientation of a working plane of the work environment relative to a base plane of the robot. The functions may also include identifying the working plane within the work environment in response to the indication. The functions may also include controlling the robot to contact one or more points of the working plane. The functions may also include determining respective point locations of the one or more contacted points relative to the base plane based on respective positions of the robot at respective times of contact. The functions may also include determining the location and angular orientation of the working plane relative to the base plane based on the determined respective point locations of the one or more contacted points.

In another example, a system is disclosed that includes a processor and a memory that stores instructions that are executed by the processor. When executed, the instructions cause the system to perform functions that include receiving an indication to determine a work offset for a robot operating in a work environment, where the work offset describes a location and an angular orientation of a working plane of the work environment relative to a base plane of the robot. The functions may also include identifying the working plane within the work environment in response to the indication. The functions may also include controlling the robot to contact one or more points of the working plane. The functions may also include determining respective point locations of the one or more contacted points relative to the base plane based on respective positions of the robot at respective times of contact. The functions may also include determining the location and angular orientation of the working plane relative to the base plane based on the determined respective point locations of the one or more contacted points.

In a further example, a system may include means for receiving an indication to determine a work offset for a robot operating in a work environment, where the work offset describes a location and an angular orientation of a working plane of the work environment relative to a base plane of the robot. The system may also include means for identifying the working plane within the work environment in response to the indication. The system may also include means for controlling the robot to contact one or more points of the working plane. The system may also include means for determining respective point locations of the one or more contacted points relative to the base plane based on respective positions of the robot at respective times of contact. The system may also include means for determining the location and angular orientation of the working plane relative to the base plane based on the determined respective point locations of the one or more contacted points.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
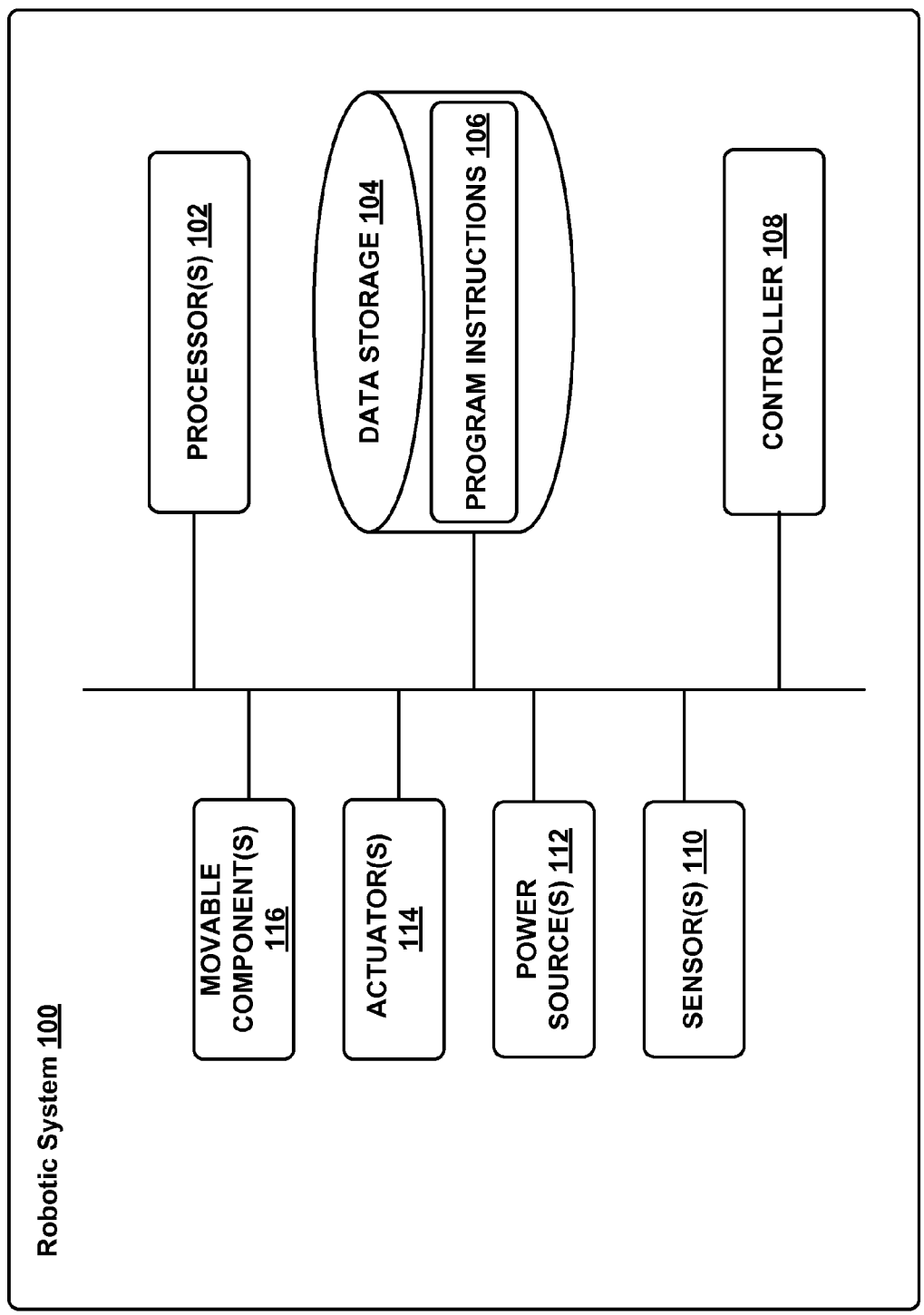
FIG. 1 illustrates an example configuration of a robotic system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

A robot may learn information about the location and orientation of planes in the environment, such as the ground plane, in order to interact with objects in the environment. For example, a user may want to control a robot with a base to execute tasks. However, the work environment surrounding the robot may be unknown. One variable may be the location and angular orientation of the working plane of the work environment, which may be the ground plane or a different plane within the work environment. The working plane may contain one or more objects for the robot to manipulate.

The location and angular orientation of the working plane may differ from the location and angular orientation of the plane of the robot base. Specifically, it may be unknown whether the working plane has shifted vertically up or down. Furthermore, the working plane may have tilted angularly relative to the base plane. The amount that the working plane has shifted and/or tilted relative to the base plane is referred to as the work offset.

In order to precisely and accurately control the robot to execute tasks, the user may want to determine the work offset. The user may manually determine the work offset by measuring three points in the working plane. Based on the selected three points, the user may then determine whether the working plane has shifted vertically (i.e., in the Z direction) and/or tipped and/or tilted (in the angular directions $\theta_x$ and $\theta_y$, respectively) relative to the base plane. However, one drawback of manual determination of the work offset is that it may be difficult to precisely measure the three points of the working plane to determine the working plane dimensions. Thus, an automated work offset determination method performed by the robot may lead to more accurate and precise control of the robot to execute tasks than a manual work offset determination method.

Automated work offset determination may be executed by the robot by performing a predetermined sequence of steps. The predetermined work offset determination method may be performed upon startup of the robot as a startup or calibration procedure to ensure accurate robot control. Alternatively, the robot may execute the predetermined or work offset determination sequence as a troubleshooting mechanism or a routine maintenance procedure. In other embodiments, the robot may execute the work offset determination method for other reasons.

The work offset determination sequence may begin by turning on the robot and/or initiating the work offset determination sequence. Next, the robot may touch multiple points on the working plane. The location of the points and/or the working plane may not be known. In one embodiment, the robot has a rough estimate of the location of the working plane.

As a result, the robot may then be moved in directions expected to cause contact between the robot and the working plane at one or more points that are not collinear. Specifically, the robot may first be actuated along a first direction until contact by the robot with the working plane at a first point is detected. The contact may be detected by a force sensor and/or an end effector of the robot. Once contact between the robot and the working plane at the point is made, actuation of the robot may be stopped temporarily. The location of the contacted point may then be determined based on the position of the robot during contact.

Once the location of the contacted point is determined, the robot may be actuated again in a similar manner to contact one or more additional points of the working plane that are not collinear with the previously contacted point. Similarly, the locations of the one or more additional points may be determined based on the position of the robot at contact. In one embodiment, the robot may touch three or more points of the working plane.

Once the locations of the contacted points have been determined, the robot may then calculate the tip and the tilt of the working plane relative to the base plane. Additionally, the robot may also calculate the height of the vertical shift of the working plane relative to the base plane. Once the tip, tilt, and height have been calculated, the robot may then express the work offset as a tip dimension, a tilt dimension, and a height dimension of the working plane relative to the base plane. The robot may use the work offset data to execute one or more tasks in the work environment.

In some embodiments, the work offset determination sequence by the robot may only be run once. For example, if the working plane is fixed and doesn't change, the work offset determination sequence may only need to be run once. In one embodiment, the robot base may be attached to a stationary table. Alternatively, the work offset determination sequence may be run multiple times by the robot. In particular, if the robot base moves, or the working plane changes, then the work offset determination sequence may be run again to account for any additional tilts and/or shifts of the working plane.

In one example, a work offset determination sequence may be run multiple times when a robot is picking up or working with pallets that are moving along a conveyor belt. In this case, each pallet may have a unique size, height, tip, and/or tilt. Thus, for each pallet, the robot may execute a work offset determination sequence to determine the work offset for the particular pallet. Specifically, the robot determines the vertical shift (e.g., Z direction), the tip, and the tilt (angular direction, $\theta_x$ and $\theta_y$, respectively) of the plane of the pallet relative to the plane of the robot base. Thus, in this embodiment, even though the robot is stationary, the work offset determination sequence may be performed multiple times due to the changes in the working plane (e.g., a different pallet).

In one embodiment, the robot may rely on a camera to obtain an initial estimate of the dimensions of the working plane. For example, the robot may use a coarse depth camera to determine an initial estimate of the vertical shift and/or tip and/or tilt of the working plane. In some embodiments, the robot may determine a work offset for multiple planes. Referring back to the conveyor belt and pallet example, the robot may determine the work offset for each particular pallet. By calculating an accurate and precise work offset, the robot can better execute tasks accurately and precisely.

Referring now to the figures, FIG. 1 shows an example configuration of a robotic system 100. The robotic system 100 may be a robotic arm, a different type of robotic manipulator, or it may have a number of different forms. Additionally, the robotic system 100 may also be referred to as a robotic device, robotic manipulator, or robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only as robotic system 100 may include additional components and/or have one or more components removed without departing from the scope of the invention. Further, note that the various components of robotic system 100 may be connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some embodiments, the data storage 104 can be implemented using a single physical device (e.g., one optical, magnetic, organic or other memory or disc storage unit), while in other embodiments, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, motion sensors, load sensors, position sensors, touch sensors, depth sensors, ultrasonic range sensors, and infrared sensors, among other possibilities. The sensor(s) 110 may provide sensor data to the processor(s) 102 to allow for appropriate interaction of the robotic system 100 with the environment. Additionally, the sensor data may be used in evaluation of various factors for providing feedback as further discussed below. Further, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in the robotic system 100). In other cases, an actuator may be a linear actuator that may be used in systems involving straight line motion.

In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

In some implementations, a computing system (not shown) may be coupled to the robotic system 100 and may be configured to receive input from a user, such as via a graphical user interface. This computing system may be incorporated within the robotic system 100 or may be an external computing system that is capable of (wired or wireless) communication with the robotic system 100. As such, the robotic system 100 may receive information and instructions, such as based on user-input at the graphical user interface and/or based on user-input received via press of buttons (or tactile input) on the robotic system 100, among other possibilities.

Figure 2:
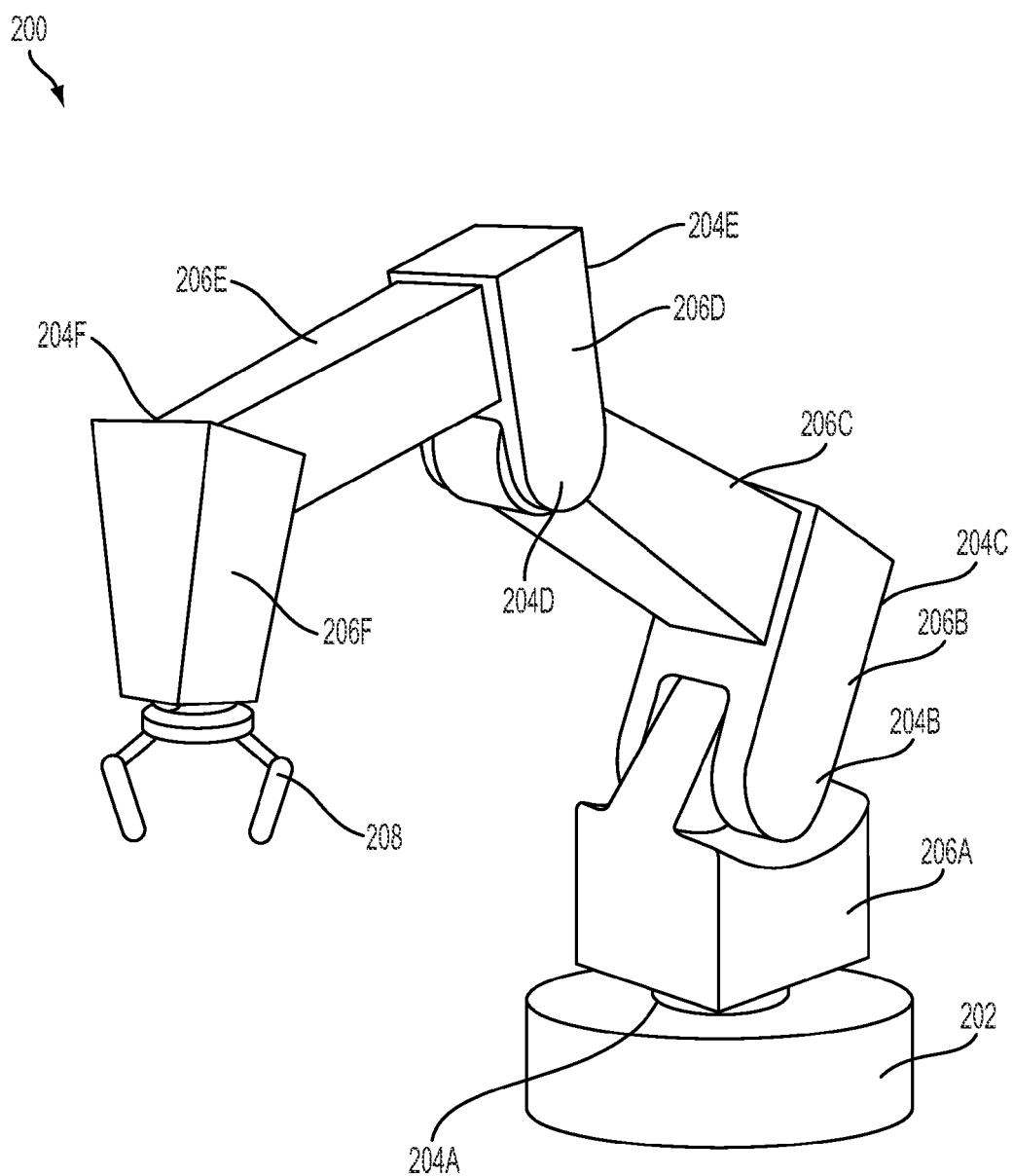
FIG. 2 illustrates an example robotic arm, according to an example embodiment.

A robotic system 100 may take on various forms. To illustrate, FIG. 2 shows an example robotic arm 200. As shown, the robotic arm 200 includes a base 202, which may be a stationary base or may be a movable base. In the case of a movable base, the base 202 may be considered as one of the movable component(s) 116 and may include wheels (not shown), powered by one or more of the actuator(s) 114, which allow for mobility of the entire robotic arm 200.

Additionally, the robotic arm 200 includes joints 204A-204F each coupled to one or more of the actuator(s) 114. The actuators in joints 204A-204F may operate to cause movement of various movable component(s) 116 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the movable component(s) 116, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3A:
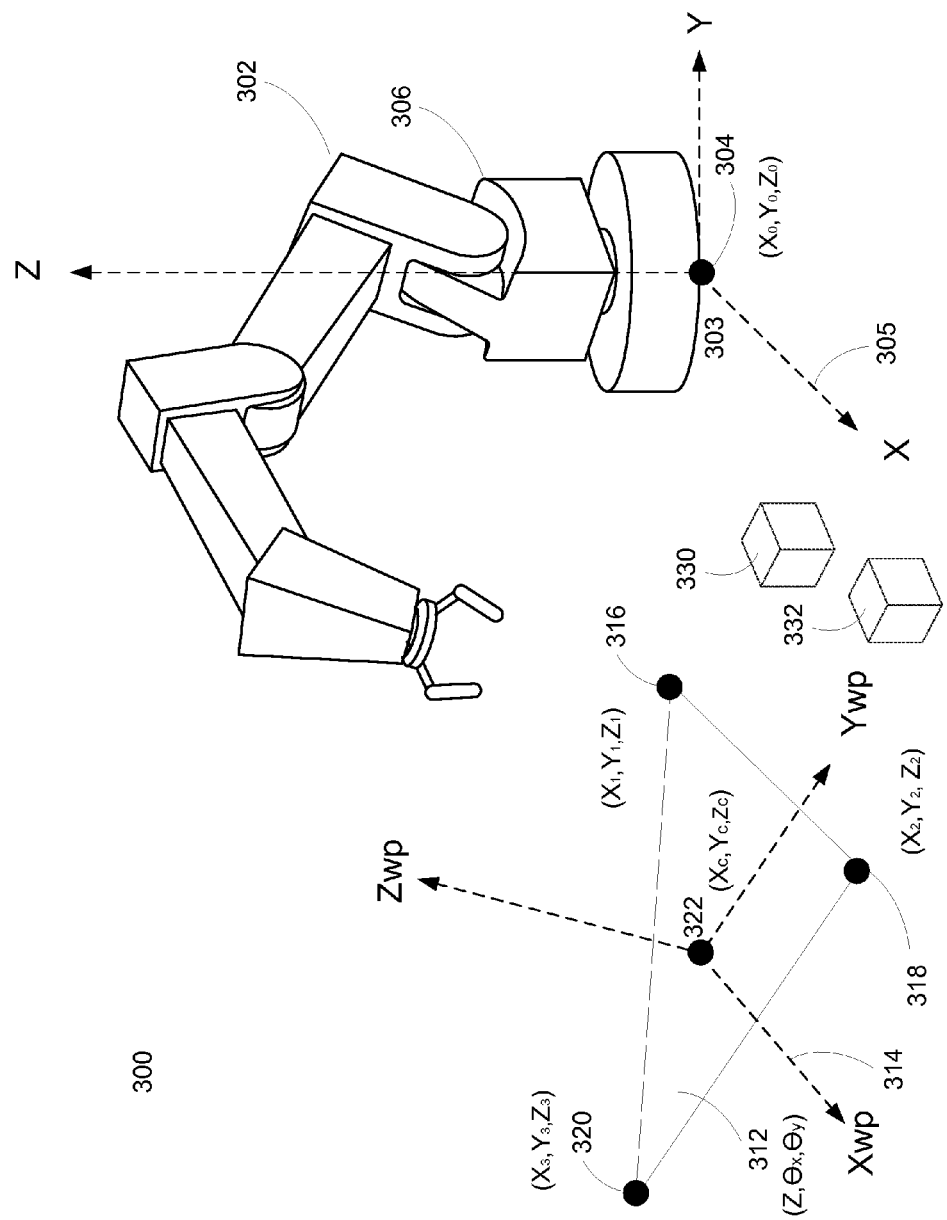
FIG. 3A illustrates an example robotic arm and a working plane in a work environment, according to an example embodiment.
Figure 3B:
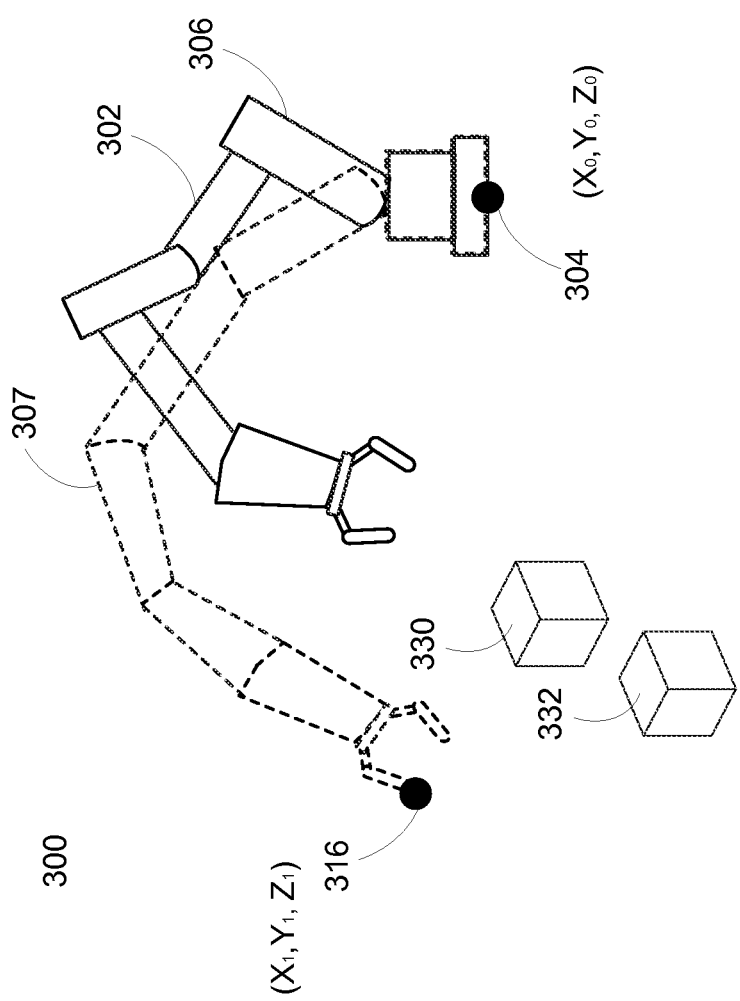
FIG. 3B illustrates an example robotic arm contacting a first point in a work environment according to an example embodiment.
Figure 3C:
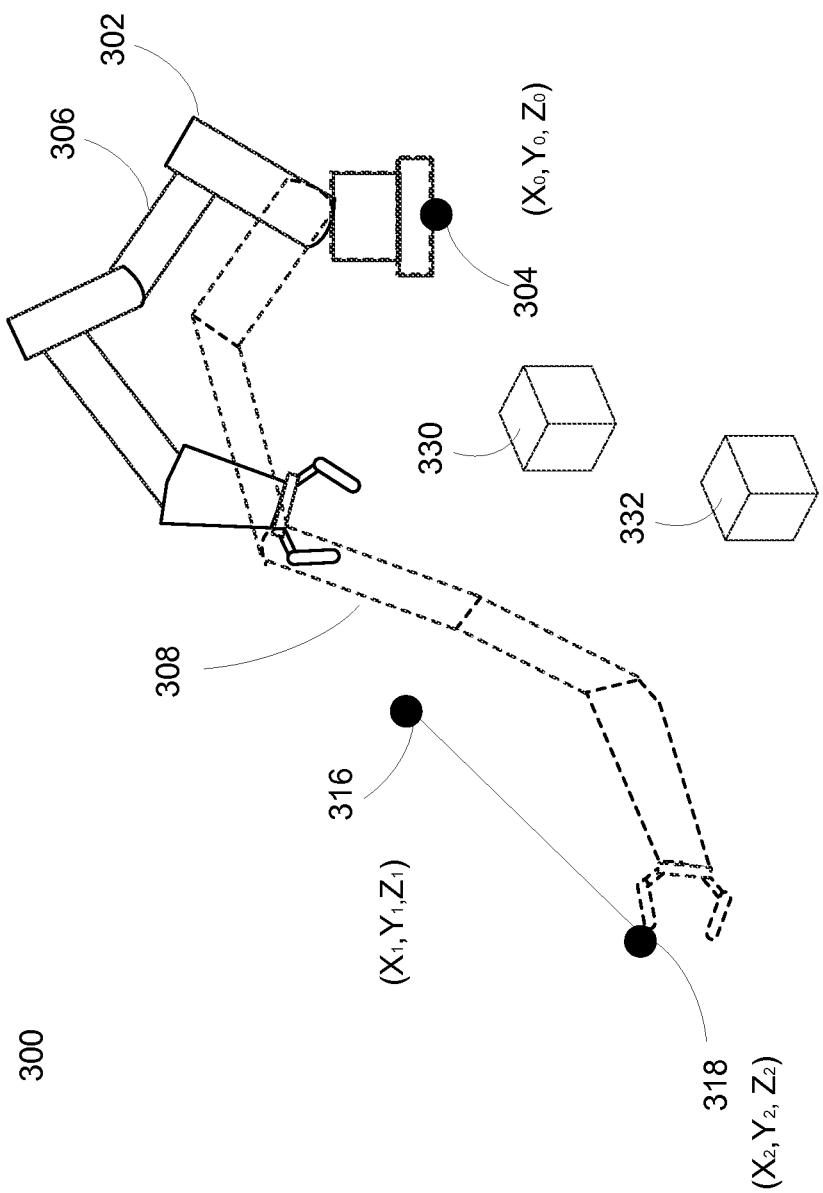
FIG. 3C illustrates an example robotic arm contacting a second point in a work environment, according to an example embodiment.
Figure 3D:
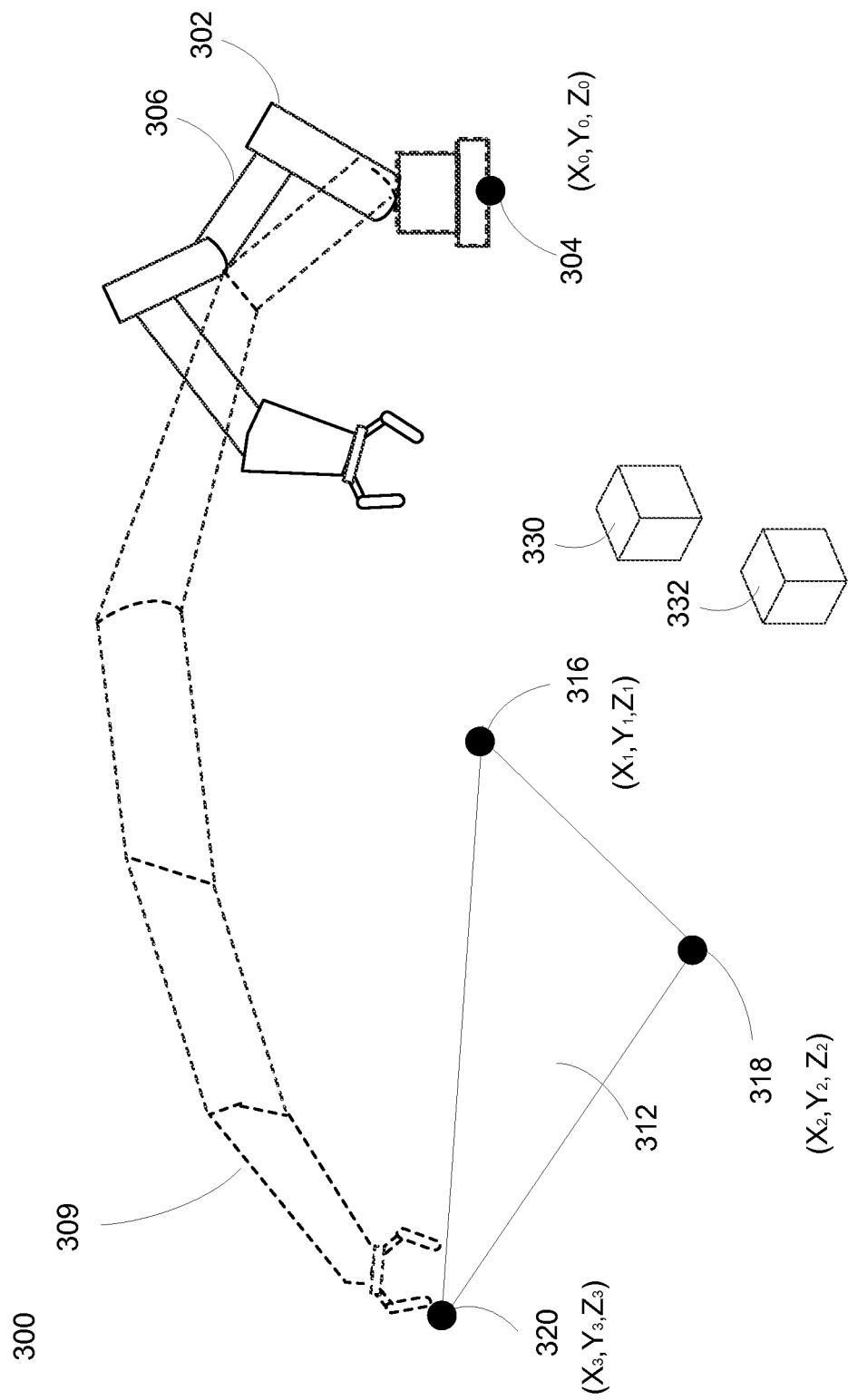
FIG. 3D illustrates an example robotic arm contacting a third point in a work environment, according to an example embodiment.

FIGS. 3A-3D display an embodiment of work environment 300. In the displayed embodiment, robot arm 302 of robot 100 is shown in various positions. In FIGS. 3A-3D, robot arm 302 is shown in a first position 306, a second position 307, a third position 308, and a fourth position 309. The robot positions in FIGS. 3B, 3C, and 3D are shown with dotted lines to indicate the position of the robot at different times. Robot arm 302 moves to the second position 307 to contact the first point 316. Robot arm 302 then moves to the third position 308 to contact the second point 318. Finally, robot arm 302 moves to the fourth position 309 to contact the third point 320. The robot arm 302 may be moved to more, fewer, and/or different positions to contact more, fewer, and/or different points than what is shown in the displayed embodiments.

In the displayed work environment 300, the robot arm 302 may be the same robot arm as robotic arm 200 from FIG. 2. Base plane 303 may be located at a base of robot arm 302. Origin 304 and legend 305 are also displayed. Legend 305 displays an X axis and a Y axis that define the base plane 303. The origin 304 is a point within the base plane 303. In some embodiments, the XYZ coordinates, $(X_0, Y_0, Z_0)$, of origin 304 may be defined as (0, 0, 0). The Z axis of legend 305 may be perpendicular to the base plane 303. In other embodiments, different base planes, points, and/or coordinate systems may be possible. In some embodiments, the location and orientation of the base plane 303, the origin 304, and/or legend 305 may be defined relative to the base plane 303 by robot 100.

The robotic arm 302 may be controlled to contact the one or more points 316, 318, and 320 to determine a work offset for the working plane 312. Legend 314 and center point 322 are also displayed. Legend 314 includes an X axis for the working plane ($X_{WP}$) and a Y axis for the working plane ($Y_{WP}$) that define the working plane 312. Legend 314 also includes a Z axis that is perpendicular to the working plane ($Z_{WP}$). The working plane 312 may also include center point 322 with a point location at $(X_C, Y_C, Z_C)$. In some embodiments, the center point may represent the midpoint of the three points 316, 318, and 320. Additionally, the working plane 312 includes the contacted points 316, 318, and 320. In other embodiments, different working planes, points, and/or coordinate systems may be possible.

In the displayed embodiments of FIGS. 3A-3D, the working plane 312 may be the ground plane of the work environment 300. Alternatively, the working plane 312 could be a different plane in the work environment. For example, in one embodiment, the working plane 312 may be the top surface of a pallet.

Additionally, a work environment 300 may include multiple workings planes. For example, a work environment 300 may include a conveyor belt, upon which multiple pallets are transported. In this embodiment, the top surface of each pallet may be considered a separate working plane. Each of the pallets on the conveyor belt may be a different height and have different angular orientations, including different tip angles and/or or tilt angles for each top surface. Thus, for each pallet, the specific working plane may have a particular work offset relative to the base plane 303 of the robot arm to 302.

Furthermore, the working plane 312 may include one or more objects 330 and 332 for the robot to manipulate. In particular, the one or more objects may rest upon the surface of the working plane 312. For example, in the displayed embodiment of FIGS. 3A-3D, where the working plane 312 is the ground plane, the one or more objects 330 and 332 could be on the ground for the robot 100 to manipulate with the robotic arm 302. Other embodiments of the work environment 300 and the working plane 312 are also possible.

The robot 100 may execute a method to determine a work offset for the working plane 312 relative to the base plane 303. The work offset describes the offset (or change) between the working plane 312 and the base plane 303 of the robot. By calculating an accurate and precise work offset, the robot may be enabled to execute tasks for the working plane precisely and accurately. For example, the robot may manipulate one or more objects 330 and 332 resting upon the working plane more accurately and precisely due to the work offset determination.

In some embodiments, the work offset may include a location and an angular orientation of the working plane 312 with respect to the base plane 303. In particular, the work offset location may be described using a shift distance along the Z axis of legend 305 that is perpendicular to base plane 303. The angular orientation of the working plane 312 relative to the base plane 303 may be described using an angular displacement value for tip and another angular displacement value for tilt. The tip value, $\theta_x$, may describe the angular rotation of the working plane 312 with respect to the X axis of legend 305. The tilt value, $\theta_y$, may describe the angular rotation of the working plane 312 with respect to the Y axis of legend 305. The tip and tilt values are displayed in and described in more detail for FIGS. 4A and 4B.

The shift distance is calculated by taking the difference in the Z coordinates between a point on the base plane 303 and a point on the working plane 312. The base plane point may be the origin 304, while the working plane point may be the center point 322. However, different points for the base plane and/or the working plane could be used to determine a shift distance. The working plane point (e.g., the center point 322, first point 316, second point 318, third point 320, or some other working plane point) may be expressed with XYZ coordinates based on legend 305 (as opposed to legend 314). However, other coordinate systems may be used, including legend 314.

The work offset determination method may be an automated procedure including a set of instructions stored on a memory to be executed by a processor of robot 100. The work offset determination method may be executed by the robot 100 in various situations. For example, the work offset determination method may be a startup procedure executed after a startup of the robot 100. Alternatively, the work offset determination method may be executed for troubleshooting purposes in response to a detected error or unexpected results detected by robot 100.

Yet another example of when the work offset determination method may be executed includes robot 100 detecting a change in the working plane 312 of the work environment 300. Alternatively, the robot 100 may execute the method in response to determining a change in the base plane 303 of the robot 100. Another alternative may include a detection of a change in the work environment 300 by robot 100, which may imply a change in the working plane 312. Alternatively, the work offset determination method may be executed by robot 100 as a routine maintenance procedure. Other reasons may also exist for robot 100 to execute the work offset determination method.

In some embodiments, the base of the robot arm 302 may be fixed to an object, such as a table. In this scenario, the work offset determination method may not be performed very often because the base plane doesn't change. In particular, if the working plane is typically the floor, the work offset determination method may only be performed once because the working plane and base plane don't change. Alternatively, the robot may not be fixed to an object. In this case, the work offset determination method may be executed more often because the base plane may change more frequently. In some embodiments, the location and orientation of the base plane is known by the robot, while in other embodiments, the location and orientation of the base plane is unknown.

Robot 100 may initiate the work offset determination method by identifying the working plane 312 within the work environment 300. In the displayed embodiment, the robot 100 may identify the ground plane (e.g., the floor) as the working plane 312 of the work environment 300. In other embodiments, such as an embodiment with a conveyor belt transporting one or more pallets, the robot 100 may identify a top surface of a particular pallet as a working plane of the work environment. Other embodiments in which the robot 100 identifies a plane of the work environment 300 as the working plane 312 are also possible.

In some embodiments, the identified working plane may not be planar. For example, an identified working plane may be a floor that is not planar. However, a certain section of the floor may be relatively planar, and thus, the method for work offset determination could still be used at least for points defining a working plane located within the relatively planar section of the floor. Other embodiments of non-planar objects identified as working planes may also be possible.

When identifying the working plane 312 of the work environment 300, the robot may rely on image data received from a camera. While in some embodiments the camera may be located on the robot, in other embodiments the image data may be received from a remote camera. In some embodiments, the image data may display at least a portion of the plane that is eventually identified as the working plane 312. Alternatively, the robot may receive approximate, or rough, data estimating or indicating the location of the working plane 312. The robot 100 may use the data (e.g., image data, received location data, rough data, etc.) to identify the working plane 312 of the work environment 300.

Next, the robot 100 may determine a path to travel along towards the identified working plane 312. The determined path may allow the robot to avoid obstacles and/or collisions as it travels towards the working plane 312. The determined path may be shorter, preferred, and/or a more efficient path for the robot to travel to get to the working plane 312. Other paths may also be determined as a path for the robot to travel to get to the working plane 312.

In some embodiments, the robot may navigate the path without knowing the exact location of the working plane 312. The robot may move along the determined path towards the working plane using a coarse estimate of the location of the working plane 312. In some embodiments, the robot 100 is unaware of the locations of the one or more points (e.g., 316, 318, and 320) that the robot will contact to determine the work offset for the working plane 312. However in other embodiments, the robot may have accurate and/or precise locations for the working plane 312 and/or the one or more points that the robot will contact to determine the work offset of the working plane 312.

Once the robot arrives at the working plane 312, the robot arm 200 may be controlled to contact one or more points on the working plane. In one embodiment, the robot is controlled to contact at least three points in the working plane. Once the robot has contacted the first point, the robot may travel towards a different location of the working plane 312 to contact the working plane at a second point. Again, as the robot travels towards the location for the second point on the working plane, the robot may not know an exact location of the working plane and/or the second point. Similarly, the robot may also travel along a path towards another different location of the working plane to contact a third point of the working plane without knowing the exact location of the working plane or the third point. In other embodiments, the robot may know the location of the working plane and/or the one or more points to contact on the working plane.

Next, the robot may determine the locations of the points contacted on the working plane. The robot can determine the location of the contacted point on the working plane by determining the position of the robot at the time of contact. The location of the point may be expressed as an XYZ coordinate based on legend 305. However, the location of the point could be expressed using different coordinate systems (e.g., legend 314). While the displayed embodiment shows the robot determining locations for three points, in other embodiments, the robot may determine locations for more or fewer points of the working plane 312. In some embodiments, the contacted points may not be collinear.

Once the point locations of the contacted points are determined by the robot, the robot can then determine a work offset. The work offset describes the location and angular orientation of the working plane 312 relative to the base plane 303. In the displayed embodiment, the work offset is described by a shift distance, a tip value, and a tilt value. In particular, in FIG. 3A, working plane 312 is expressed with the work offset of ($Z$, $\theta_x$, $\theta_w$), where "Z" represents the shift distance, $\theta_x$ represents the tip value, and $\theta_y$ represents the tilt value. However, the work offset may be expressed using different dimensions, values, and/or coordinate systems.

For example, in FIG. 3A, the robot 100 may identify working plane 312 as the working plane of work environment 300. The robot arm 302 may then determine a path to move along to contact the working plane 312. The robot 100 may not know exact locations of the working plane 312 or the points at which the robot arm 302 contacts working plane 312.

Next, FIG. 3B displays the robot arm 302 moving along the determined path from a first position 306 to a second position 307 to contact the working plane 312 at the first point 316. The robot 100 may not have knowledge of the location of the working plane 312 for point 316 while moving along the determined path. When the robot arm 302 contacts the working plane 312 at the first point 316, the robot 100 may receive force sensing data and data indicating the position of the robot during contact. The robot 100 may use the robot position information to determine the location of the first point 316 to be $(X_1, Y_1, Z_1)$. The robot may then end contact with the first point 316 and determine a path to travel along to contact the working plane 312 at a second point.

FIG. 3C displays the robot arm 302 moving along the determined path from the second position 307 to a third position 308 to contact the working plane 312 at a second point 318. The robot 100 may not have knowledge of the location of the working plane 312 or the point 318 while the robot arm 302 moves along the path. When the robot arm 302 contacts the working plane 312 at the second point 318, the robot 100 may receive force sensing data and data indicating the position of the robot during contact. The robot 100 may use the robot position information to determine the location of the second point 318 to be $(X_2, Y_2, Z_2)$. The robot may then end contact with the second point 318 and determine a path to travel along to contact the working plane 312 at a third point.

FIG. 3D displays the robot arm 302 moving along the determined path from the third position 308 to a fourth position 309 to contact the working plane 312 at a third point 320. The robot 100 may not have knowledge of the location of the working plane 312 or the point during 320 while the robot arm 302 moves along the path. When the robot arm 302 contacts the working plane 312 at the third point 320, the robot 100 may receive force sensing data and data indicating the position of the robot during contact. The robot 100 may use the robot position information to determine the location of the third point 320 to be $(X_3, Y_3, Z_3)$. The robot may then end contact with the third point 320. Once the robot has determined point locations for points 316, 318, and 320, the robot 100 may then calculate a work offset for working plane 312 relative to base plane 303.

The data collected by robot 100 when robot arm 302 contacts working plane points (e.g., 316, 318, and 320) may include force sensing data, data about the position of the robot, and/or other information. When the robot arm 302 contacts the working plane at a point, the robot 100 may stop movement of the robot arm 302, such that the robot arm 302 remains in contact with the working plane 312 at the point so that the robot 100 can collect data. The robot 100 may then move robot arm 302 to end contact with the working plane 312.

Force sensing data is acquired by the robot 100 via a force feedback sensor when the robot arm 302 contacts the working plane 312 at a point. The force feedback sensor may be located on the robot arm 302 or at some other point on the robot 100. The force feedback sensor is used to provide an indication of when the robot arm 302 is in contact with the working plane 312. The sensor may be designed to be sensitive to forces incurred by the sensor so that precise and accurate measurements of the contact can be taken. Precise and accurate measurements of the contact enable the robot to determine precise and accurate work offsets, which in turn enable precise and accurate control of the robot arm 302.

Once the force feedback sensor receives data indicating that the robot arm 302 is in contact with the working plane 312, the sensor allows the robot 100 to stop movement of the robot arm 302 while the robot 100 gathers data. By pausing movement of the robot arm 302, the force sensor helps prevent the robot arm 302, the working plane 312, and the robot 100 from incurring any additional damage due to repetitive or excessive contact.

Instead of using a force feedback sensor, other force monitoring methods may be used to determine contact between the robot and the working plane. For example, a robot may sense force by monitoring motor current, monitoring deflection of encoders, or employing other robot force detection methods. While force sensing methods may be employed to determine contact between the robot and the working plane, other contact determination methods are also possible. For example, the robot may monitor a halt in robot motion (using encoders or some other method), monitor electrical continuity between the working plane and the robot arm (or some other part of the robot), or use a different type of contact and/or non-contact sensor used in robotics.

The robot 100 may also obtain and/or determine position data for the robot while the robot arm 302 contacts the working plane 312. In some embodiments, the data may be acquired using an IMU attached to the robot, while in other embodiments, other sensors attached to the robot may be used. The positions of the robot may be determined based on encoded joint angles during contact between the robot arm 302 and the working plane 312 at a point. Based on the determined positions of the robot, the robot may determine locations of the one or more points contacted by the robot arm 302. Using the determined point locations, the robot 100 can then determine the work offset for the working plane 312.

Although FIGS. 3A-3D display methods for determining point locations based on robot arm contact with the working plane, point locations may be determined without the robot arm contacting the working plane. For example, certain proximity sensors (such as optical, inductive, capacitive, or other types of proximity sensors) may be used to detect when the robot reaches a specified threshold distance from the working plane. In this case, the robot may also know, or have a rough estimate of, the working plane location. The robot may then determine the point location based on the known robot position, the distance between the robot and the working plane, and the working plane location. Other point location determination methods may also be possible.

Figure 4A:
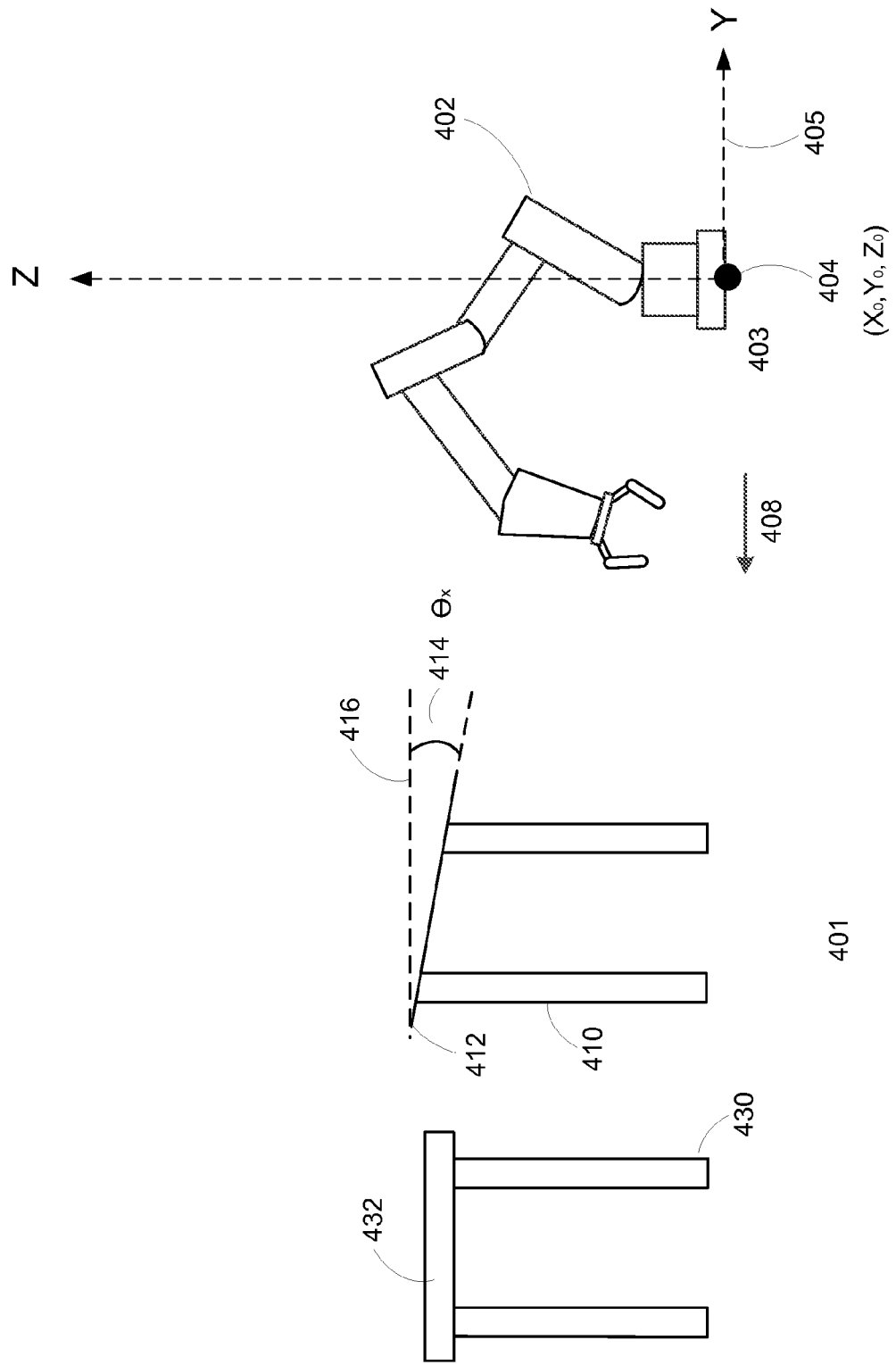
FIG. 4A is a side view of an example robot and working planes in a work environment, according to an example embodiment.
Figure 4B:
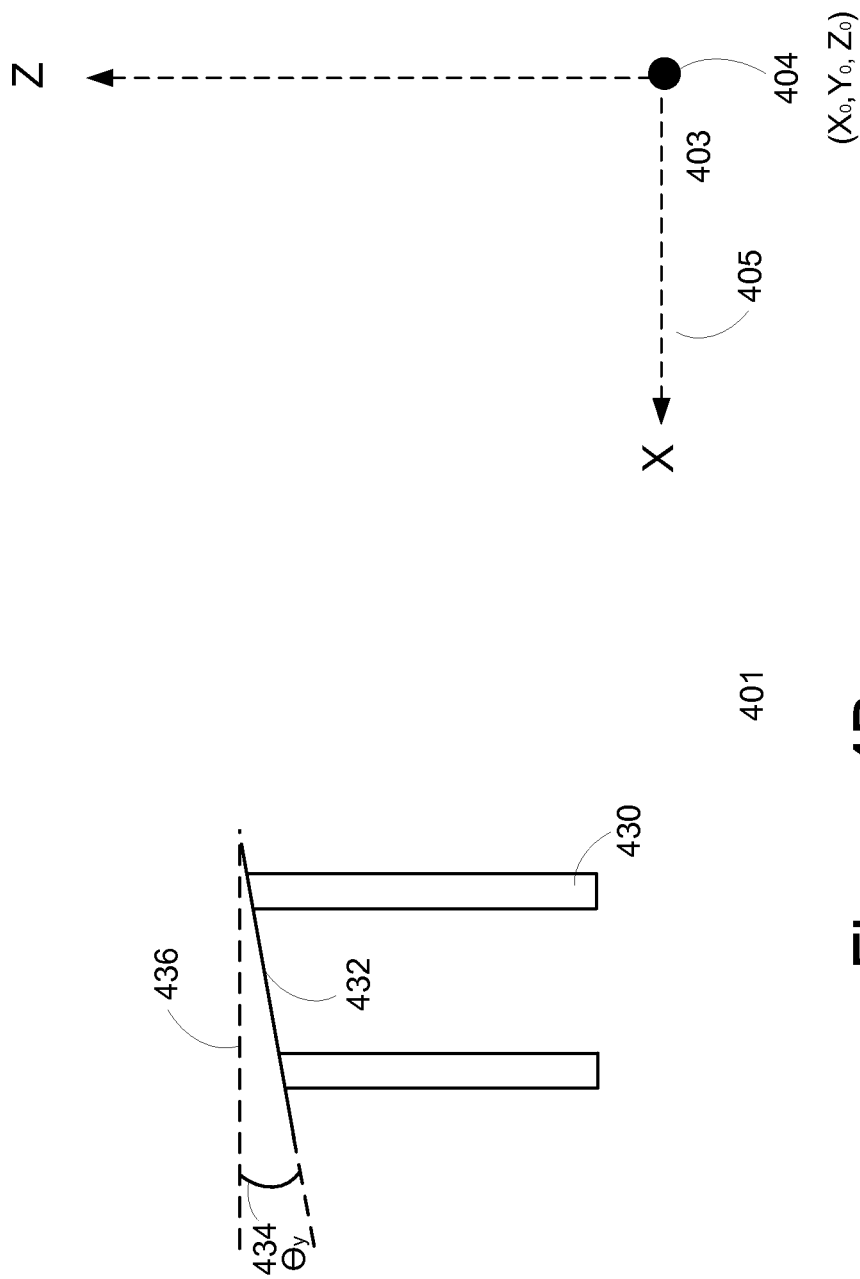
FIG. 4B is a side view of an example working plane in a work environment, according to an example embodiment.

FIGS. 4A and 4B display an embodiment of a robot arm 402 and a work environment 401. FIG. 4A is a side view 400 of the robotic arm 402 in a work environment 401. Base plane 403 may be located at a base of robotic arm 402. Base plane 403 is defined by the X axis and the Y axis of legend 405. Base plane 403 includes an origin 404 with the location $(X_0, Y_0, Z_0)$. In some embodiments, origin 404 is located at (0, 0, 0). Legend 405 also includes a Z axis that is perpendicular to the base plane 403. A viewing direction 408 is shown that is parallel to the Y axis of legend 405 and views the objects 410 and 430 from the vantage point of the robot arm 402.

View 400 also displays objects 410 and 430. Object 410 includes a top surface 412 identified as a working plane by robot 100. The tip value $\theta_x$ 414 of the working plane 412 represents the angular displacement of the working plane 412 relative to the base plane 403 with respect to the X axis of legend 405. The tip value $\theta_x$ 414 equals the measurement of the angle between the working plane 412 and reference axis 416. Reference axis 416 is an axis that is parallel to the Y axis of legend 405. In other embodiments, the tip value 414 may represent a different measurement of angular displacement of the working plane 412.

In FIG. 4B, 450 is a side view of object 430 in work environment 401 along the viewing direction 408 from the vantage point of the robot arm 402. In FIGS. 4A and 4B, object 430 includes top surface 432 identified as a working plane by robot 100. The tilt value $\theta_y$ 434 of the working plane 432 represents the angular displacement of the working plane 432 relative to the base plane 403 with respect to the Y axis of legend 405. The tilt value $\theta_y$ 434 equals the measurement of the angle between the working plane 432 and reference axis 436. Reference axis 436 is an axis that is parallel to the X axis of legend 405. In other embodiments, the tilt value 434 may represent a different measurement of angular displacement of the working plane 432.

Figure 5:
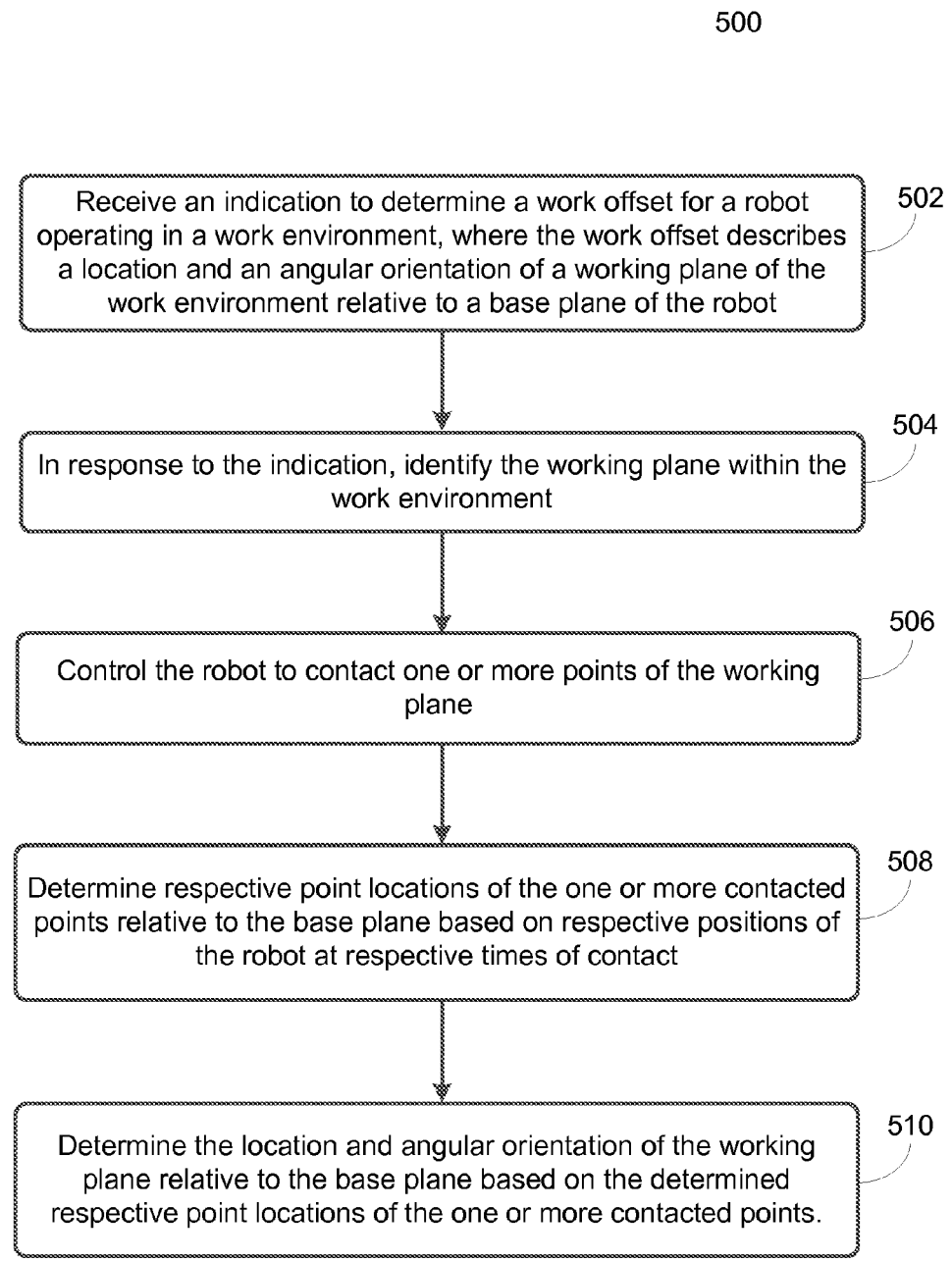
FIG. 5 is a block diagram of an example method, according to an example embodiment.

FIG. 5 illustrates a flowchart showing the method 500 that may allow for determining a tool offset, according to an example embodiment. The method 500 may be carried out by a robot, such as the robot illustrated and described with respect to FIG. 1. However, a robot control system, or some other device, that is different from the robot described in FIG. 1 may also execute method 500.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

As shown by block 502 of FIG. 5, method 500 may involve receiving an indication to determine a work offset for a robot operating in a work environment, where the work offset describes a location and an angular orientation of a working plane of the work environment relative to a base plane of the robot. In some examples, the indication may be a change in the working plane, a change in the base plane, an initial startup of the robot, routine maintenance, or troubleshooting of an error or unexpected results.

Method 500 may further involve identifying a working plane within the work environment in response to the indication, as shown by block 504 of FIG. 5. In some examples, the robot may identify the working plane based on image data received from a camera of the robot. Method 500 may also involve controlling the robot to contact one or more points of the working plane, as shown by block 506 of FIG. 5. In some examples, robot may receive force sensing data indicating the robot has contacted the working plane. In additional examples, the robot may stop controlling the robot to contact a contacted point in response to the received force sensing data.

As shown by block 508 of FIG. 5, method 500 may additionally involve determining respective point locations of the one or more contacted points relative to the base plane based on respective positions of the robot at respective times of contact. In some examples, the positions of the robot may be determined based on encoded joint angles. In additional examples, the robot may contact at least three points, and thus determine at least three point locations.

Method 500 may additionally involve determining the location and angular orientation of the working plane relative to the base plane based on the determined respective point locations of the one or more contacted points, as shown by block 510 of FIG. 5. In some examples, the location of the working plane may be described by a shift distance along a Z axis perpendicular to the base plane. In additional examples, the angular orientation of the working plane relative to the base plane may be described by an angular displacement with respect to an X axis of the base plane (tip), and an angular displacement with respect to a Y axis of the base plane (tilt).

Various applications and environments using robots are possible for the disclosed systems and methods. For example, some environments where work offset determination for robots may be applicable include manufacturing facilities, mailing or shipping facilities, airports, hospitals, or other environments employing robots. Furthermore, other applications where work offset determination for robots in a work environment may be applicable include construction, shipping, manufacturing, healthcare, and/or other applications using robots. Other applicable environments and applications for the disclosed systems and methods may also be possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving an indication to determine a work offset for a robot operating in a work environment, wherein the work offset describes a location and an angular orientation of a working plane of the work environment relative to a base plane of the robot;
   in response to the indication, identifying the working plane within the work environment;
   providing instructions by a processor to cause an arm of the robot to contact one or more points of the working plane;
   determining one or more respective positions of the robot when the arm of the robot contacts the one or more points of the working plane;
   based on the one or more respective positions of the robot, determining respective point locations of the one or more contacted points of the working plane relative to the base plane; and
   determining the location and angular orientation of the working plane relative to the base plane based on the determined respective point locations of the one or more contacted points.

2. The method of claim 1, wherein the working plane angular orientation measures an angular displacement of the working plane relative to the base plane.

3. The method of claim 2, wherein the working plane location measures a shift distance between a point on the base plane and a corresponding point on the working plane along a vertical axis perpendicular to the robot base plane.

4. The method of claim 1, wherein the arm of the robot is controlled to cause the arm of the robot to contact three separate, non-collinear points on the working plane.

5. The method of claim 1, wherein the working plane is a ground plane of the work environment.

6. The method of claim 1 further comprising:
   after determining the work offset a first time, detecting a change in the base plane; and
   in response to the detected base plane change, determining the work offset a second time.

7. The method of claim 1 further comprising:
   after determining the work offset a first time, detecting a change in the working plane; and
   in response to the detected working plane change, determining the work offset a second time.

8. The method of claim 1, wherein the indication to determine the work offset is generated in response to detection of an initial startup of the robot.

9. The method of claim 1, wherein the indication to determine the work offset is generated in response to detection of an error associated with robot operation.

10. The method of claim 1, wherein identifying the working plane within the work environment further comprises:
    identifying the working plane within the work environment based on image data from a camera, wherein the image data displays at least a portion of the working plane.

11. The method of claim 1, wherein the working plane angular orientation measures angular displacement of the working plane relative to a first axis of the base plane and angular displacement of the working plane relative to a second axis of the base plane, wherein the second axis is perpendicular to the first axis.

12. The method of claim 1, wherein the respective positions of the robot are determined based on encoded joint angles.

13. The method of claim 1, wherein the working plane is a surface, wherein one or more objects for the robot to manipulate are located on the working plane surface.

14. The method of claim 1 further comprising:
    in response to identifying the working plane, determining a path toward the plane;
    moving along the determined path towards the working plane;
    receiving force sensing data from a force sensor on the robot when the robot contacts any of the one or more points of the working plane;
    based on the force sensing data, determining that the robot has contacted the working plane at one of the one or more points; and
    in response to determining that the robot has contacted the working plane, causing the robot to stop to determine a respective position of the robot at a respective time of contact.

15. A non-transitory computer-readable medium storing instructions that are executable by one or more computing devices, wherein executing the instructions causes the one or more computing devices to perform functions comprising:
    receiving an indication to determine a work offset for a robot operating in a work environment, wherein the work offset describes a location and an angular orientation of a working plane of the work environment relative to a base plane of the robot;
    in response to the indication, identifying the working plane within the work environment;
    controlling an arm of the robot to cause the arm of the robot to contact one or more points of the working plane;
    determining one or more respective positions of the robot when the arm of the robot contacts the one or more points of the working plane;
    based on the one or more respective positions of the robot, determining respective point locations of the one or more contacted points of the working plane relative to the base plane; and determining the location and angular orientation of the working plane relative to the base plane based on the determined respective point locations of the one or more contacted points.

16. The non-transitory computer-readable medium of claim 15, wherein executing the instructions further causes the one or more computing devices to perform functions comprising:
   after determining the work offset a first time, detecting a change in the base plane; and
   in response to the detected base plane change, determining the work offset a second time.

17. The non-transitory computer-readable medium of claim 15, wherein executing the instructions further causes the one or more computing devices to perform functions comprising:
   after determining the work offset a first time, detecting a change in the working plane; and
   in response to the detected working plane change, determining the work offset a second time.

18. A system comprising:
   a processor; and
   a memory storing instructions that when executed by the processor cause the system to perform functions comprising:
   receiving an indication to determine a work offset for a robot operating in a work environment, wherein the work offset describes a location and an angular orientation of a working plane of the work environment relative to a base plane of the robot;
   in response to the indication, identifying the working plane within the work environment;
   controlling an arm of the robot to cause the arm of the robot to contact one or more points of the working plane;
   determining one or more respective positions of the robot when the arm of the robot contacts the one or more points of the working plane;
   based on the one or more respective positions of the robot, determining respective point locations of the one or more contacted points of the working plane relative to the base plane; and
   determining the location and angular orientation of the working plane relative to the base plane based on the determined respective point locations of the one or more contacted points.

19. The system of claim 18, wherein the robot is controlled to contact at least three points on the working plane.

20. The system of claim 18, wherein identifying the working plane within the work environment further comprises:
   identifying the working plane within the work environment based on image data from a camera, wherein the image data displays at least a portion of the working plane.

* * * * *